US011926510B2

(12) United States Patent
Goto et al.

(10) Patent No.: US 11,926,510 B2
(45) Date of Patent: Mar. 12, 2024

(54) CRANE

(71) Applicant: TADANO LTD., Kagawa (JP)

(72) Inventors: Tomokazu Goto, Kagawa (JP); Shinsuke Kanda, Kagawa (JP); Kazuma Mizuki, Kagawa (JP)

(73) Assignee: TADANO LTD., Kagawa (JP)

( * ) Notice: Subject to any disclaimer, the term of this patent is extended or adjusted under 35 U.S.C. 154(b) by 868 days.

(21) Appl. No.: 16/976,358

(22) PCT Filed: Feb. 28, 2019

(86) PCT No.: PCT/JP2019/007958
§ 371 (c)(1),
(2) Date: Aug. 27, 2020

(87) PCT Pub. No.: WO2019/168133
PCT Pub. Date: Sep. 6, 2019

(65) Prior Publication Data

US 2021/0047152 A1 Feb. 18, 2021

(30) Foreign Application Priority Data

Feb. 28, 2018 (JP) ................................ 2018-035209

(51) Int. Cl.
*B66C 13/20* (2006.01)
*B66C 13/48* (2006.01)
(Continued)

(52) U.S. Cl.
CPC .............. *B66C 13/20* (2013.01); *B66C 13/48* (2013.01); *B66C 23/54* (2013.01); *B66C 23/90* (2013.01); *B66C 13/06* (2013.01)

(58) Field of Classification Search
CPC ......... B66C 13/20; B66C 13/48; B66C 13/16; B66C 13/46
See application file for complete search history.

(56) References Cited

U.S. PATENT DOCUMENTS 4,030,088 A * 6/1977 McCullough ......... B66C 15/045 212/280
6,442,439 B1 8/2002 Robinett et al.

FOREIGN PATENT DOCUMENTS

JP S56-149995 A 11/1981
JP 0441395 A * 1/1992 ........... B66C 13/063
(Continued)

OTHER PUBLICATIONS

Oct. 22, 2021, European Search Report issued for related EP Application No. 19760969.6.
(Continued)

*Primary Examiner* — Abiy Teka
(74) *Attorney, Agent, or Firm* — Paratus Law Group, PLLC

(57) ABSTRACT

This crane is provided with: a operable functional unit; an actuator; a generation unit that generates a first control signal including a first deceleration signal section composed of a control signal for decelerating a speed of the operable functional unit from a first speed to a second speed and a first constant-speed signal section composed of a control signal for maintaining the speed of the operable functional unit at the second speed; a filter unit for filtering the first control signal to generate a second control signal; and a control unit that controls the actuator so as to decelerate the operable functional unit based on the second control signal, then controls the actuator so as to maintain the speed at the second speed, and controls the actuator so as to zero the speed when a load has been moved to a location satisfying a prescribed condition.

10 Claims, 10 Drawing Sheets

(51) Int. Cl.

*B66C 23/00* (2006.01)
*B66C 23/90* (2006.01)
*B66C 13/06* (2006.01)

(56) References Cited

FOREIGN PATENT DOCUMENTS

| | | | | | |
|---|---|---|---|---|---|
| JP | H05-201690 | A | | 8/1993 | |
| JP | 10147492 | A | * | 6/1998 | |
| JP | H10-212092 | A | | 8/1998 | |
| JP | 2015-151211 | A | | 8/2015 | |
| JP | 2000-095477 | A | | 4/2020 | |
| WO | WO 2005/012155 | A1 | | 2/2005 | |
| WO | WO-2005012155 | A1 | * | 2/2005 | ........... B66C 13/063 |

OTHER PUBLICATIONS

May 14, 2019, International Search Report issued for related PCT Application No. PCT/JP2019/007958.

May 14, 2019, International Search Opinion issued for related PCT Application No. PCT/JP2019/007958.

* cited by examiner

CRANE

CROSS REFERENCE TO PRIOR APPLICATION

This application is a National Stage Patent Application of PCT International Patent Application No. PCT/JP2019/007958 (filed on Feb. 28, 2019) under 35 U.S.C. § 371, which claims priority to Japanese Patent Application No. 2018-035209 (filed on Feb. 28, 2018), which are all hereby incorporated by reference in their entirety.

TECHNICAL FIELD

The present invention relates to a crane.

BACKGROUND ART

Conventionally, a crane has been known as a typical work vehicle. The crane is mainly configured by a traveling body and a turning body. The traveling body includes a plurality of wheels and is configured to be able to travel. The turning body includes a boom, a wire rope, a hook, and the like. Such a turning body is configured to be able to carry a load. Further, such a crane includes an actuator which is used for moving a load and a control device which can instruct an operating state of the actuator.

By the way, a crane is proposed in which the control device creates a filtering control signal and controls the actuator on the basis of the filtering control signal (see Patent Literature 1). Here, the filtering control signal means a signal to apply a filter having a predetermined characteristic to the basic control signal of the actuator. For example, the filter may be a notch filter. The notch filter has a characteristic that an attenuation rate becomes higher as a frequency approaches a resonance frequency in an arbitrary range around the resonance frequency. Incidentally, the resonance frequency is calculated on the basis of the suspension length of the hook.

In such a crane, in order to stop a moving load at a predetermined location, it is necessary to start deceleration appropriately before the predetermined location. However, the location corresponding to "appropriately before the predetermined location" varies depending on the working radius of the boom, the suspension length of the hook, the weight of the load, and the like. Therefore, it has been difficult to reliably stop the load at the predetermined location. Further, there is a concern that when the load passes the predetermined location, the load collides with a building or the like. In this regard, there is a demand for a crane which is capable of decelerating a load while suppressing the swing of the load and stopping the load at the predetermined location when automatically stopping the movement of the load.

CITATION LIST

Patent Literature

Patent Literature 1: JP 2015-151211 A

SUMMARY OF THE INVENTION

Problems to be Solved by the Invention

An object of the present invention is to provide a crane which is capable of decelerating a load while suppressing swing of the load and stopping the load at a predetermined location when automatically stopping movement of the load.

Solutions to Problems

One aspect of a crane according to the present invention includes:

a operable functional unit;

an actuator for driving the operable functional unit; a generation unit that, in control of causing the operable functional unit to automatically stop, generates a first control signal including a first deceleration signal section including a control signal for decelerating a speed of the operable functional unit from a first speed to a second speed and a first constant-speed signal section including a control signal for maintaining the speed of the operable functional unit at the second speed;

a filter unit for filtering at least the first deceleration signal section in the first control signal to generate a second control signal; and a control unit that controls the actuator so as to decelerate the operable functional unit on the basis of the second control signal, then controls the actuator so as to maintain the speed of the operable functional unit at the second speed, and controls the actuator so as to zero the speed of the operable functional unit in a case where a load suspended from the crane moves to a location satisfying a prescribed condition.

Effects of the Invention

According to the present invention, it is possible to provide a crane which is capable of decelerating a load while suppressing swing of the load and stopping the load at a predetermined location when automatically stopping movement of the load.

DESCRIPTION OF EMBODIMENTS

Figure 1:
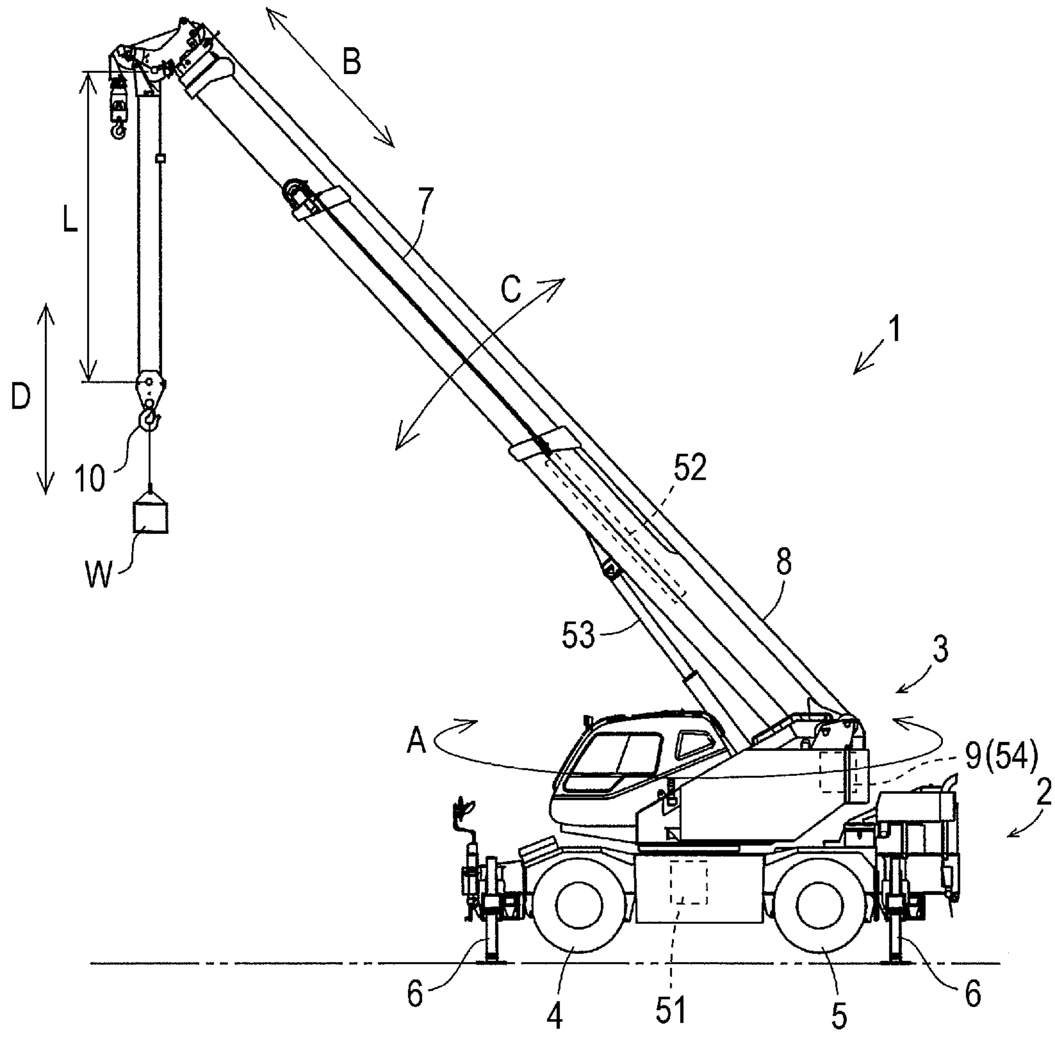
FIG. 1 is a diagram illustrating a crane.

The technical idea disclosed in this application can be applied to various cranes in addition to a crane 1 described below.

First, the crane 1 will be described with reference to FIG. 1.

The crane 1 is mainly configured by a traveling body 2 and a turning body 3.

The traveling body 2 includes a pair of right and left front tires 4 and a rear tire 5. In addition, the traveling body 2 is provided with an outrigger 6 which is grounded to achieve stability when performing a work of carrying a load W. Incidentally, in the traveling body 2, the turning body 3 supported on the upper part thereof can be turned by an actuator.

The turning body 3 is provided with a boom 7 so as to project forward from the rear part thereof. Therefore, the boom 7 can be turned by an actuator (see arrow A). Further, the boom 7 can be extended/retracted by an actuator (see arrow B). The boom 7 corresponds to an example of a operable functional unit.

The boom 7 can be hoisted by an actuator (see arrow C). In addition, a wire rope 8 is stretched over the boom 7. A winch 9 around which a wire rope 8 is wound is arranged on the base end side of the boom 7, and a hook 10 is suspended by the wire rope 8 on the tip end side of the boom 7. The winch 9 corresponds to an example of the operable functional unit.

The winch 9 is configured integrally with an actuator, and the wire rope 8 can be wound and unwound. Therefore, the hook 10 can be lifted/lowered by the actuator (see arrow D).

Figure 2:
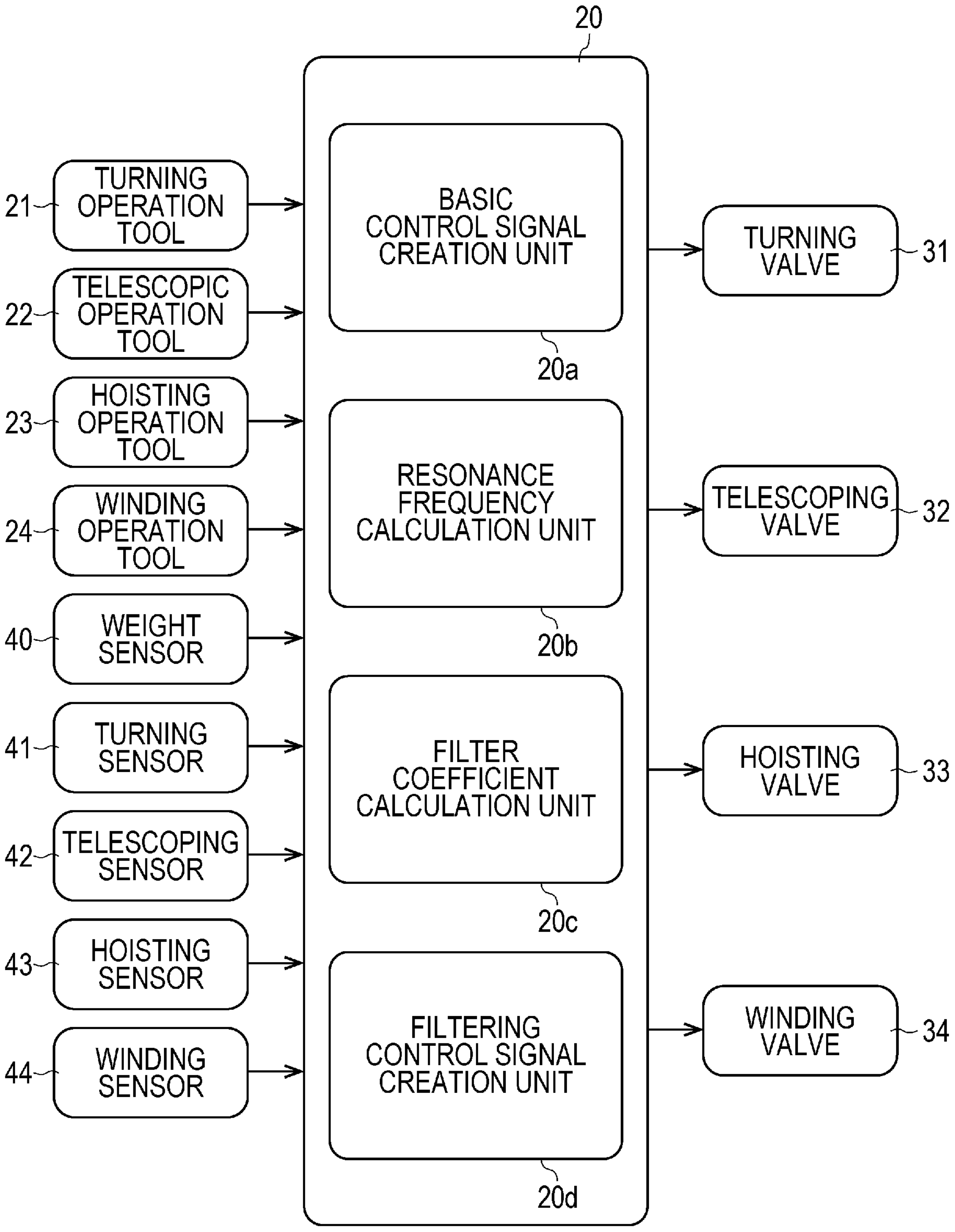
FIG. 2 is a diagram illustrating a configuration of an automatic stop system.

Next, an automatic stop system will be described with reference to FIG. 2. However, this automatic stop system is an example of a conceivable configuration and is not limited to this.

The automatic stop system is mainly configured by a control device 20. A turning operation tool 21, a telescopic operation tool 22, a hoisting operation tool 23, and a winding operation tool 24 are connected to the control device 20. Further, a turning valve 31, a telescoping valve 32, a hoisting valve 33, and a winding valve 34 are connected to the control device 20.

A weight sensor 40, a turning sensor 41, a telescoping sensor 42, a hoisting sensor 43, and a winding sensor 44 are connected to the control device 20. Incidentally, the weight sensor 40 can detect the weight of the load W. Therefore, the control device 20 can recognize the weight of the load W.

As described above, the boom 7 can be turned by the actuator (see arrow A in FIG. 1). In this application, a turning hydraulic motor 51 corresponds to an example of an actuator. The turning hydraulic motor 51 is appropriately operated by the turning valve 31 which is an electromagnetic proportional switching valve.

In other words, the turning hydraulic motor 51 is appropriately operated when the turning valve 31 switches the flow direction of a hydraulic oil or adjusts the flow rate of the hydraulic oil. Incidentally, the turning angle and the turning speed of the boom 7 are detected by the turning sensor 41. Therefore, the control device 20 can recognize the turning angle and the turning speed of the boom 7.

As described above, the boom 7 can be extended/retracted by the actuator (see arrow B in FIG. 1). A telescoping hydraulic cylinder 52 corresponds to an example of the actuator. The telescoping hydraulic cylinder 52 is appropriately operated by the telescoping valve 32 which is an electromagnetic proportional switching valve.

In other words, the telescoping hydraulic cylinder 52 is appropriately operated when the telescoping valve 32 switches the flow direction of the hydraulic oil or adjusts the flow rate of the hydraulic oil. Incidentally, the telescoping length and telescoping speed of the boom 7 are detected by the telescoping sensor 42. Therefore, the control device 20 can recognize the telescoping length and the telescoping speed of the boom 7.

As described above, the boom 7 can be hoisted by the actuator (see arrow C in FIG. 1). A hoisting hydraulic cylinder 53 corresponds to an example of the actuator. The hoisting hydraulic cylinder 53 is appropriately operated by the hoisting valve 33 which is an electromagnetic proportional switching valve.

In other words, the hoisting hydraulic cylinder 53 is appropriately operated when the hoisting valve 33 switches the flow direction of the hydraulic oil or adjusts the flow rate of the hydraulic oil. Incidentally, the hoisting angle and the hoisting speed of the boom 7 are detected by the hoisting sensor 43. Therefore, the control device 20 can recognize the hoisting angle and the hoisting speed of the boom 7.

In addition, as described above, the hook 10 can be lifted/lowered by the actuator (see arrow D in FIG. 1). A winding hydraulic motor 54 corresponds to an example of the actuator. The winding hydraulic motor 54 is appropriately operated by the winding valve 34 which is an electromagnetic proportional switching valve.

In other words, the winding hydraulic motor 54 is appropriately operated when the winding valve 34 switches the flow direction of the hydraulic oil or adjusts the flow rate of the hydraulic oil. Incidentally, a suspension length L (see FIG. 1) or the lifting/lowering speed of the hook 10 is detected by the winding sensor 44. Therefore, the control device 20 can recognize the suspension length L or the lifting/lowering speed of the hook 10.

By the way, the control device 20 controls respective actuators (51, 52, 53, and 54) via the various valves 31 to 34. The control device 20 includes a basic control signal creation unit 20*a*, a resonance frequency calculation unit 20*b*, a filter coefficient calculation unit 20*c*, and a filtering control signal creation unit 20*d*.

Figure 4:
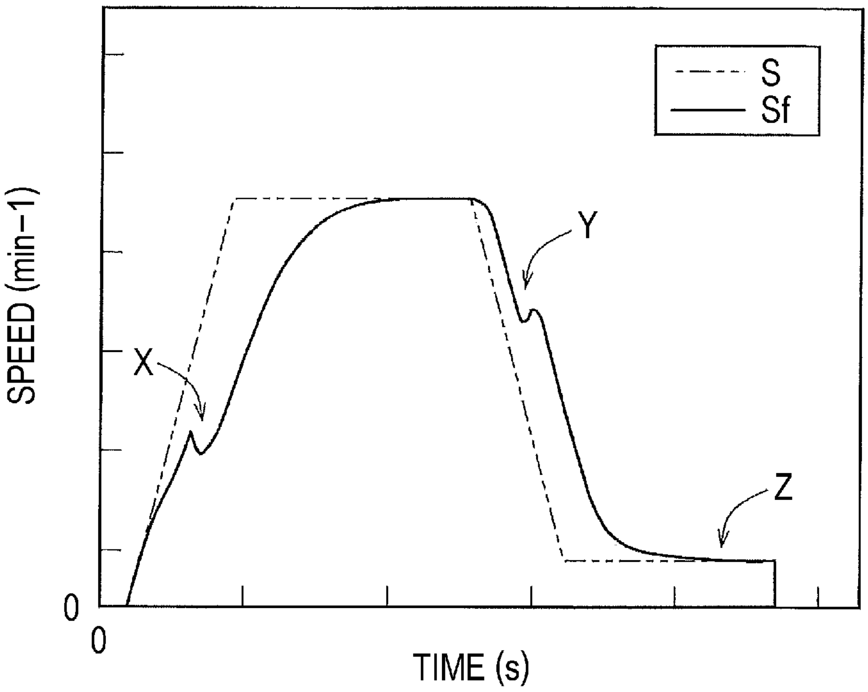
FIG. 4 is a diagram illustrating a basic control signal and a filtering control signal.

The basic control signal creation unit 20*a* creates a basic control signal S which is a speed command for each actuator (51, 52, 53, and 54) (see FIG. 4). The basic control signal creation unit 20*a* recognizes the operation amounts of the various operation tools 21 to 24 by the operators and creates the basic control signal S for each situation. The basic control signal creation unit 20*a* corresponds to an example of a generation unit. The generation unit may be regarded as included in the control device 20. However, the generation unit may not be included in the control device 20.

Specifically, the basic control signal creation unit 20*a* creates the basic control signal S according to the operation amount of the turning operation tool 21, the basic control signal S according to the operation amount of the telescopic operation tool 22, the basic control signal S according to the operation amount of the hoisting operation tool 23, the basic control signal S according to the operation amount of the winding operation tool 24, and/or the like.

The resonance frequency calculation unit 20*b* is a unit for calculating a resonance frequency ω which is the frequency of the swing of the load W caused by the operation of each actuator (51, 52, 53, and 54). The resonance frequency calculation unit 20*b* recognizes the suspension length L of the hook 10 on the basis of the posture of the boom 7 and the unwinding amount of the wire rope 8 and calculates the resonance frequency ω for each situation.

Specifically, the resonance frequency calculation unit 20*b* calculates the resonance frequency ω on the basis of the following equation using the suspension length L of the hook 10 and a gravitational acceleration g.

$\omega=\sqrt{(g/L)}$ [Equation 1]

The filter coefficient calculation unit 20*c* calculates a center frequency coefficient ωn, a notch width coefficient ζ, and a notch depth coefficient δ of a transfer coefficient H(s) included in a notch filter F described later. The filter coefficient calculation unit 20*c* calculates the corresponding center frequency coefficient ωn centering on the resonance frequency ω calculated by the resonance frequency calculation unit 20*b*.

The filter coefficient calculation unit 20*c* calculates the notch width coefficient ζ and the notch depth coefficient δ corresponding to each basic control signal S. Incidentally, the transfer coefficient H(s) is expressed by the following equation using the center frequency coefficient ωn, the notch width coefficient ζ, and the notch depth coefficient δ.

$$H(s)=\frac{s^2+2\delta\zeta\omega_n s+\omega_n^2}{s^2+2\zeta\omega_n s+\omega_n^2}$$ [Equation 2]

The filtering control signal creation unit 20*d* creates the notch filter F and also applies the notch filter F to the basic control signal S to create a filtering control signal Sf (see FIG. 4). The filtering control signal creation unit 20*d* creates the notch filter F by obtaining the various coefficients ωn, ζ, and δ from the filter coefficient calculation unit 20*c*. The filtering control signal creation unit 20*d* corresponds to an example of a filter unit. The filter unit may be regarded as included in the control device 20. However, the filter unit may not be included in the control device 20.

The notch filter F is expressed by a load swing reduction rate determined on the basis of the notch width coefficient ζ and the notch depth coefficient δ. Further, the filtering control signal creation unit 20*d* obtains the basic control signal S from the basic control signal creation unit 20*a* and applies the notch filter F to the basic control signal S to create the filtering control signal Sf.

More specifically, the filtering control signal creation unit 20*d* creates the filtering control signal Sf on the basis of the basic control signal S and the notch filter F according to the operation amount of the turning operation tool 21 and the like. Further, the filtering control signal creation unit 20*d* creates the filtering control signal Sf on the basis of the basic control signal S and the notch filter F according to the operation amount, of the telescopic operation tool 22 and the like. Further, the filtering control signal creation unit 20*d* creates the filtering control signal Sf on the basis of the basic control signal S and the notch filter F according to the operation amount of the hoisting operation tool 23 and the like. Further, the filtering control signal creation unit 20*d* creates the filtering control signal Sf on the basis of the basic control signal S and the notch filter F according to the operation amount of the winding operation tool 24 and the like.

With such a configuration, the control device 20 can control the various valves 31 to 34 on the basis of the filtering control signal Sf. As a result, the control device 20 controls each actuator (51, 52, 53, and 54) on the basis of the filtering control signal Sf. The control device 20 corresponds to an example of a control unit.

Figure 3:
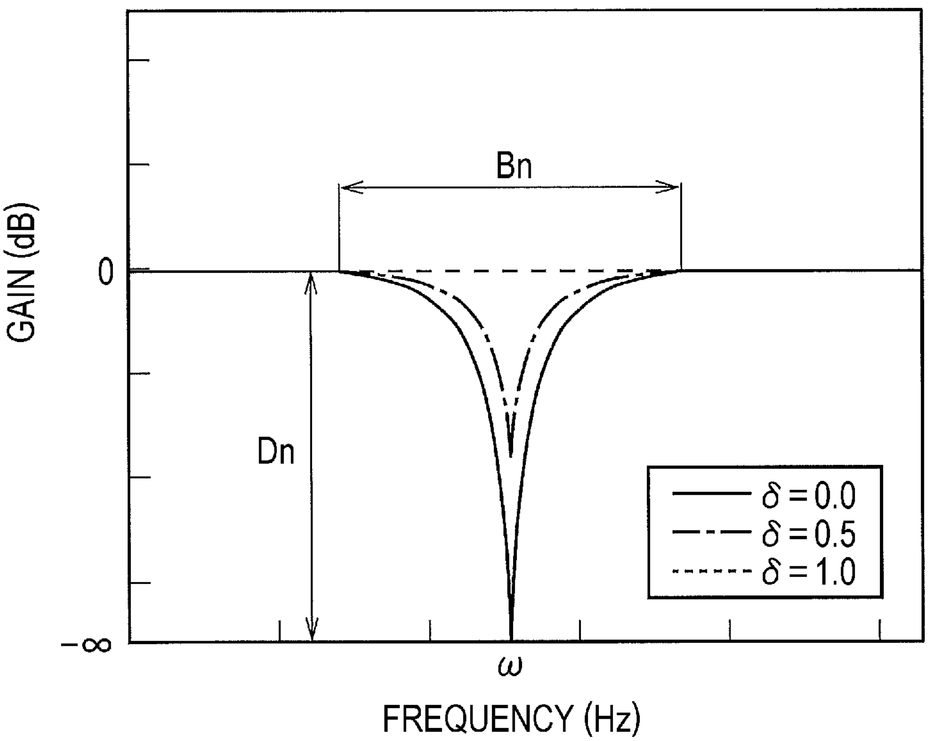
FIG. 3 is a diagram illustrating frequency characteristics of a notch filter.

Next, the notch filter F and the filtering control signal Sf will be described with reference to FIGS. 3 and 4.

The notch filter F has a characteristic that an attenuation rate becomes higher as a frequency approaches a resonance frequency ω in an arbitrary range around the resonance frequency ω. The arbitrary range around the resonance frequency ω is expressed as a notch width Bn. The difference in the amount of attenuation in the notch width Bn is expressed as a notch depth Dn.

Therefore, the notch filter F is specified by the resonance frequency ω, the notch width Bn, and the notch depth Dn. Incidentally, the notch depth Dn is determined on the basis of the notch depth coefficient δ. Therefore, in the case of the notch depth coefficient δ=0, the gain characteristic at the resonance frequency ω is −∞ dB, and in the case of the notch depth coefficient δ=1, the gain characteristic at the resonance frequency ω is 0 dB.

The filtering control signal Sf is a speed command transmitted to each actuator (51, 52, 53, and 54). The filtering control signal Sf corresponding to the acceleration of the load W has a characteristic that is moderate in acceleration compared to the basic control signal S, and is temporarily decelerated and then accelerated again (see a X section in FIG. 4). Here, the reason of the temporary deceleration is to suppress the swing of the load W during acceleration.

The filtering control signal Sf corresponding to the deceleration of the load W has a characteristic that is moderate or the same in deceleration compared to the basic control signal S, and is temporarily accelerated and then decelerated again (see a Y section in FIG. 4). Here, the reason of the temporary acceleration is to suppress the swing of the load W during deceleration.

The filtering control signal Sf has a characteristic that a low-speed command maintains after the load W is decelerated (see a Z section in FIG. 4). The reason for doing this will be described later.

Figure 5:
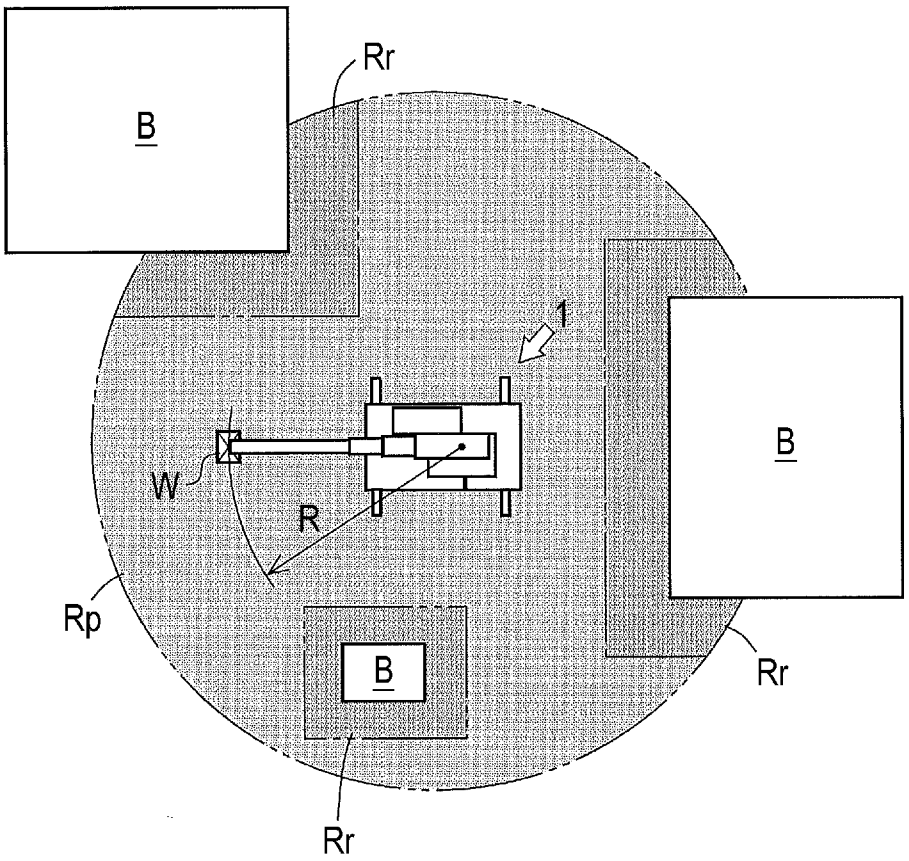
FIG. 5 is a diagram illustrating a movement allowable area and a movement restriction area of a load.

Next, a movement allowable area Rp and a movement restriction area Rr of the load W will be described with reference to FIG. 5. The movement allowable area Rp corresponds to an example of the first area. The movement restriction area Rr corresponds to an example of the second area.

The movement allowable area Rp indicates an area where the movement of the load W is permitted at a work site. In the movement allowable area Rp, the notch depth coefficient δ is 0 or a value close to 0. Accordingly, it is possible to suppress the swing of the load W with respect to the operation of the operator. However, the notch depth coefficient δ may be set to 1 or a value close to 1 so that a prompt reaction to the operation of the operator can be obtained.

The movement restriction area Rr indicates an area where movement of the load W is not permitted at the work site. In the movement restriction area Rr, the load W does not enter the area, and thus, the notch depth coefficient δ and the like are not defined. Further, the movement restriction area Rr is provided so as to surround a building B. Therefore, the collision between the load W and the building B can be prevented.

Incidentally, in a case where the load W in the movement allowable area Rp is moving toward the movement restriction area Rr, it is necessary to decelerate the load W while suppressing the swing of the load W and stop the load at the boundary between the movement allowable area Rp and the movement restriction area Rr. In this application, the boundary between the movement allowable area Rp and the movement restriction area Rr is defined as a predetermined location P. However, the predetermined location P is not limited. The predetermined location P may be any location where the load W is desired to be stopped. The control device 20 may have a function of calculating the predetermined location P on the basis of predetermined information. The predetermined information may be detection values of various sensors provided on the crane 1, imaging data of a camera, and/or location information obtained by GPS.

Figure 6:
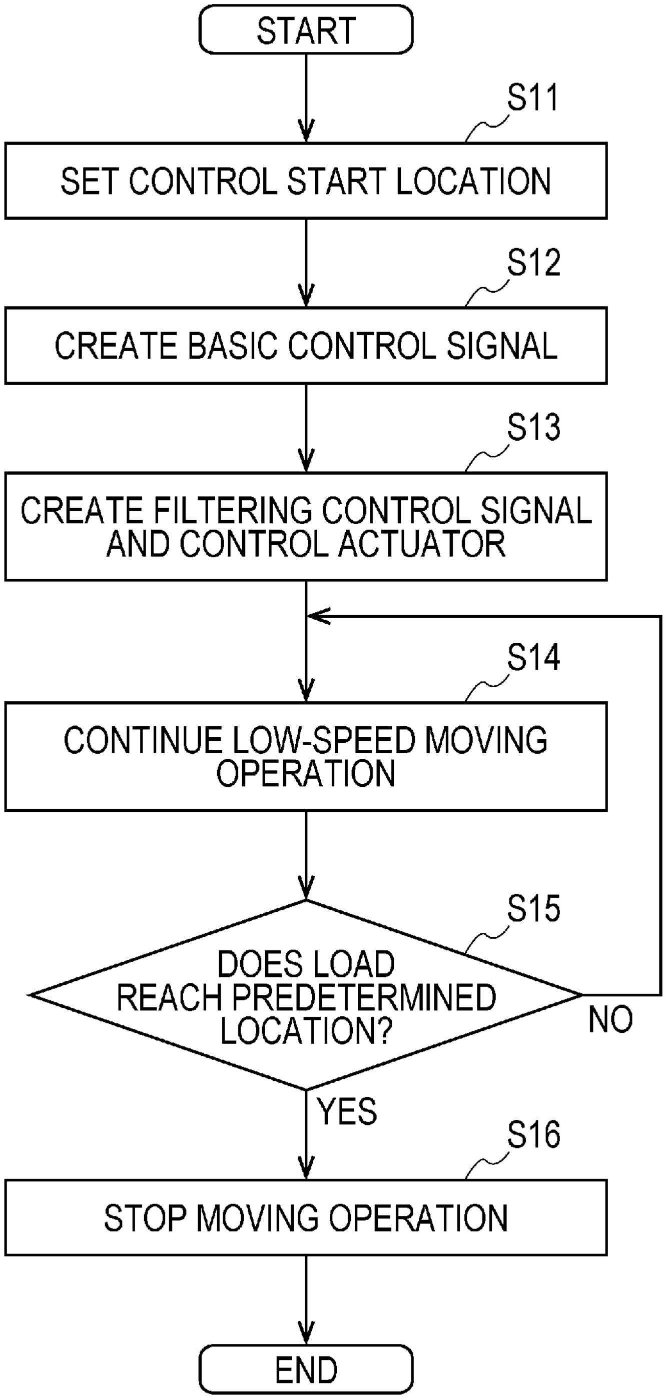
FIG. 6 is a diagram illustrating a control mode of decelerating and stopping the load at a predetermined location while suppressing swing of the load.

Hereinafter, a control mode (also referred to as automatic stop control) for automatically stopping the movement of the load W will be described with reference to FIG. 6.

First, an example will be described in which the load W is moving toward the movement, restriction area Rr by the turning operation of the boom 7. (A) to (D) of FIG. 7 schematically illustrate the movement of the load W.

In step S11, the control device 20 sets a control start location for automatic stop. In other words, the control device 20 sets the control start location at which the turning operation of the boom 7 is stopped. The control start location is determined by the turning speed of the boom 7, a working radius R of the boom 7 (see FIG. 5), the suspension length L of the hook 10, the weight of the load W, and the like. The control start location may be regarded as corresponding to a start location of a first deceleration signal section of the basic control signal S described later.

Figure 7:
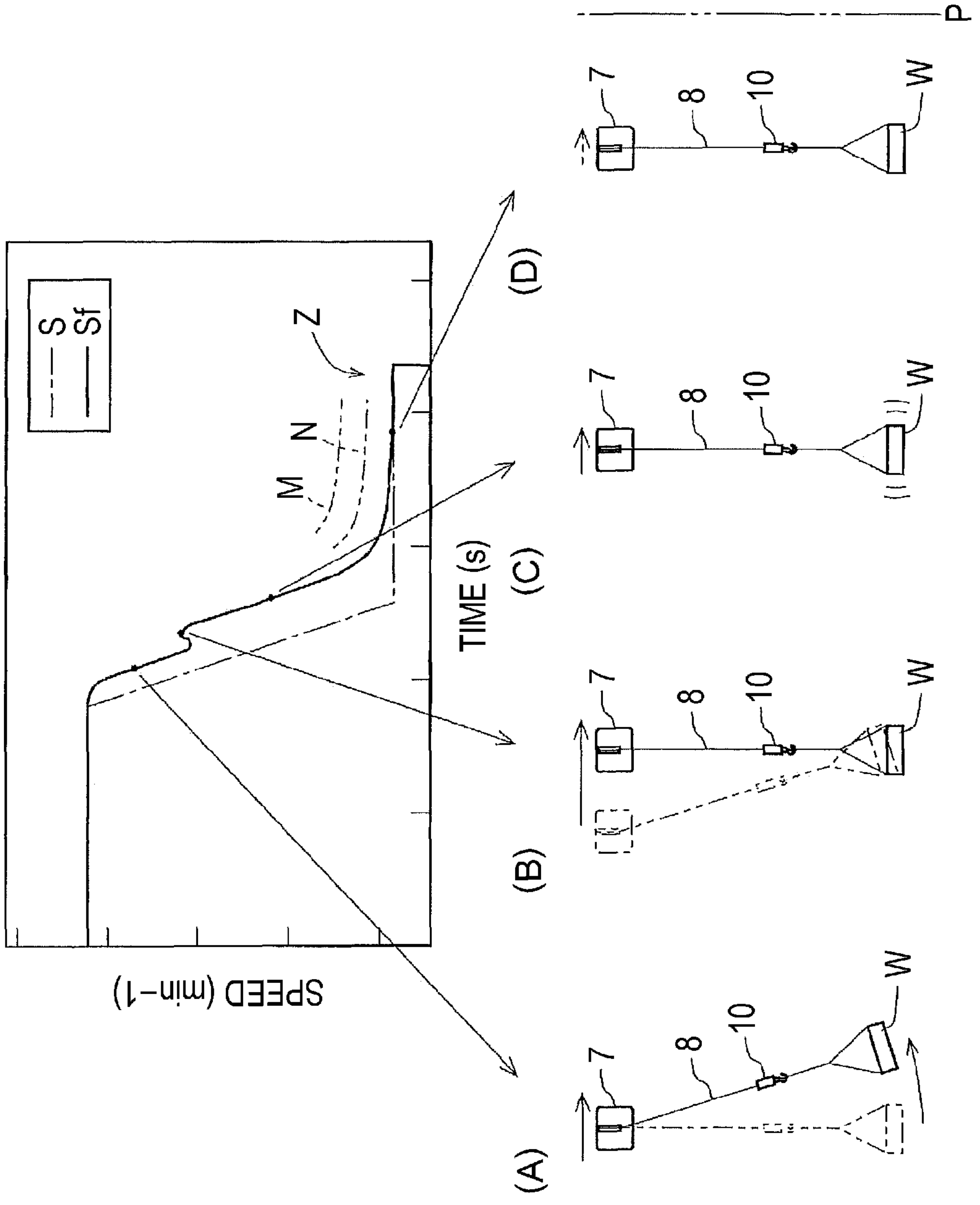
FIG. 7 is a diagram illustrating movement of the load when a turning operation of the boom is automatically stopped.

In step S12, the control device 20 creates the basic control signal S of the turning hydraulic motor 51 (see FIG. 7). The basic control signal S is created such that a constant low speed command maintains from a section related to the deceleration of the turning speed (an inclined section of the basic control signal S).

In other words, the basic control signal S includes the first deceleration signal section for decelerating the turning speed of the boom 7 from a first, speed to a second speed at a predetermined deceleration rate (also referred to as a first deceleration rate) and a first constant-speed signal section for maintaining the turning speed of the boom 7 at a predetermined speed (that, is, the second speed).

The predetermined speed (second speed) may be, for example, the lowest speed that can be realized as the turning speed of the boom 7. In a state where the turning speed of the boom 7 is a predetermined speed (second speed), it may be regarded that the hydraulic oil of the minimum flow rate is supplied to the actuator (the turning hydraulic motor 51 in this example).

Incidentally, the basic control signal S is created on the basis of a program used during automatic stop. The program is stored in the control device 20 in advance.

The temporal length of the firsts constant-speed signal section of the basic control signal S may be infinite. Further, the first constant-speed signal section of the basic control signal S may be set in advance. The time length of the first constant-speed signal section of the basic control signal S may be longer than a time required until the load W reaches the predetermined location P after the automatic stop control starts, and the speed (the turning speed of the boom 7 in this example) of the operable functional unit (the boom 7 in this example) reaches the second speed.

In step S12, the control device 20 may generate the first deceleration signal section of the basic control signal S and may not generate the first constant-speed signal section. In other words, the first deceleration signal section and the first constant-speed signal section of the basic control signal S may not be generated at the same time.

In step S12, in a case where the control device 20 does not generate the first constant-speed signal section of the basic control signal S, the control device 20 may generates the first constant-speed signal section of the basic control signal S in real time in step S14 described later. In this case, the first constant-speed signal section may or may not be subjected to a filtering process by the notch filter F.

In step S13, the control device 20 applies the notch filter F to the basic control signal S to create the filtering control signal Sf (see FIG. 7). The filtering control signal Sf is created such that a low speed command maintains from a section related to the deceleration of the turning speed (an inclined section of the filtering control signal Sf) (see Z section in FIG. 7). In other words, the filtering control signal Sf includes a second deceleration signal section corresponding to the first deceleration signal section of the basic control signal S and a second constant-speed signal section corresponding to the first constant-speed signal section of the basic control signal S.

Then, the control device 20 controls the turning hydraulic motor 51 on the basis of the filtering control signal Sf. As a result, it is possible to suppress the swing of the load W due to the deceleration of the turning speed (see (A) to (C) in FIG. 7).

In other words, when the turning speed of the boom 7 is reduced, the load W starts to swing due to inertia (see (A) in FIG. 7). In this regard, by temporarily increasing the turning speed of the boom 7, the boom 7 is caught up, and the swing of the load W is suppressed (see (B) in FIG. 7). Then, thereafter, the load W is decelerated again in the state of suppressing the swing of the load W (see (C) in FIG. 7).

In step S14, the control device 20 causes the boom 7 to continue the low-speed turning operation. Specifically, in step S14, the control device 20 controls the actuator (the turning hydraulic motor 51 in this example) on the basis of the second constant-speed signal section among the second deceleration signal section and the second constant-speed signal section (see arrow Z in FIG. 7) of the filtering control signal Sf. As a result, the load W approaches the predetermined location P without swinging (see (D) in FIG. 7). Incidentally, as described above, the control device 20 may generate the first constant-speed signal section of the basic control signal S in real time in step S14. Further, in step S14, the control device 20 may or may not perform the filtering process by the notch filter F on the first constant-speed signal section of the basic control signal S generated in real time.

Incidentally, the turning speed at this time may be determined on the basis of at least one of the working radius R of the boom 7, the suspension length L of the hook 10, and the weight of the load W (for example, determined by assigning at least one to a predetermined function: see double-dashed lines M and N in FIG. 7). Such a procedure is performed in order to move the load W to the predetermined location P as quickly as possible while appropriately suppressing the swing of the load W.

In step S15, the control device 20 determines whether or not the load W reaches the predetermined location P. In a case where it is determined that the load W reaches the predetermined location P ("YES" in step S15), the control process proceeds to step S16. The predetermined location P may be regarded as corresponding to one example of a location which satisfies a prescribed condition. Incidentally, in step S15, the control device 20 may determine whether or not the load W reaches a location separated from the predetermined location P a predetermined distance to the movement allowable area Rp side. In this case, the location separated by the predetermined distance from the predetermined location P to the movement allowable area Rp side may be regarded as corresponding to one example of the location which satisfies the prescribed condition. The location separated by the predetermined distance from the predetermined location P to the movement allowable area Rp side may be a location which allows the load W to stop at the predetermined location P when the supply of the hydraulic oil to the actuator is stopped.

On the other hand, in a case where it is determined that the load W does not reach the predetermined location P ("NO" in step S15), the control process continues the low-speed turning operation in step S14. Accordingly, the load W does not stop before the predetermined location P and is reliably moved to the predetermined location P. Further, since the load 31 does not swing greatly, the load does not pass the predetermined location P to enter the movement restriction area Rr.

In step S16, the control device 20 stops the turning operation of the boom 7. In this way, the load W reliably stops at the predetermined location P. Incidentally, the amount of movement of the load W after the control device 20 issues an instruction to zero the turning speed of the boom 7 may not be zero. For example, the amount of movement can be calculated in advance on the basis of a flow amount (a movement distance until stopping the turning operation after issuing an instruction) calculated on the basis of the second speed corresponding to the first constant-speed signal section of the basic control signal S. When a distance from a boundary location between the movement allowable area Rp (first area) and the movement restriction area Rr (second area) to an object (building B) is set larger than the flow amount calculated in this way, it is possible to prevent the load W from colliding with the object. Further, in step S16, when the control device 20 controls the actuator (the turning hydraulic motor 51 in this example) to zero the speed (the turning speed of the boom 7 in this example) of the operable functional unit (the boom 7 in this example), a stop control signal (the section that drops vertically from the second speed to zero in FIG. 4) for zeroing the speed of the operable functional unit may or may not be subjected to a filtering process by the notch filter F. In the control for zeroing the speed of the operable functional unit, when the stop control signal which is not subjected to the filtering process is used, the flow amount of the load W or the boom 7 can be set to zero or almost zero. The stop control signal may be generated by the control device 20 (specifically, the basic control signal creation unit 20*a*) when the load W reaches the predetermined location P in step S15.

As described above, this crane 1 includes the actuator (turning hydraulic motor 51) which is used for moving the load W and the control device 20 which can instruct the operating state of the actuator (51). Then, when automatically stopping the movement of the load W, the control device 20 applies the notch filter F to the basic control signal S of the actuator (51) to create the filtering control signal Sf. Next, the control device 20 controls the actuator (51) on the basis of the filtering control signal Sf to reduce the moving speed while suppressing the swing of the load W. Thereafter, the control device 20 continues the low-speed movement and stops the load at the predetermined location P.

Specifically, the control device 20 controls the turning hydraulic motor 51 on the basis of the filtering control signal Sf to reduce the turning speed while suppressing the swing of the load W. Thereafter, the control device 20 continues the low-speed turning operation and stops the load at the predetermined location P.

According to the crane 1 as described above, when the turning operation of the boom 7 is automatically stopped, it is possible to decelerate the load W while suppressing the swing of the load W and stop the load at the predetermined location P.

In the crane 1, the turning speed in the low-speed turning operation is determined on the basis of at least one of the working radius R of the boom 7, the suspension length L of the hook 10, and the weight of the load W. According to such a crane 1, it is possible to move the load W to the predetermined location P as quickly as possible while appropriately suppressing the swing of the load W and stop the load.

By the way, in the crane 1, in order to suppress the swing of the load W caused, by the turning operation of the boom 7, the frequency of the swing of the load W is set to the resonance frequency ω. However, in order to suppress the swing of the boom 7 itself caused by the turning operation of the boom 7, the frequency of the swing of the boom 7 may be set to the resonance frequency ω. Further, the resonance frequency ω may be set in consideration of the frequency of the swing of the load W and the frequency of the swing of the boom 7.

Figure 8:
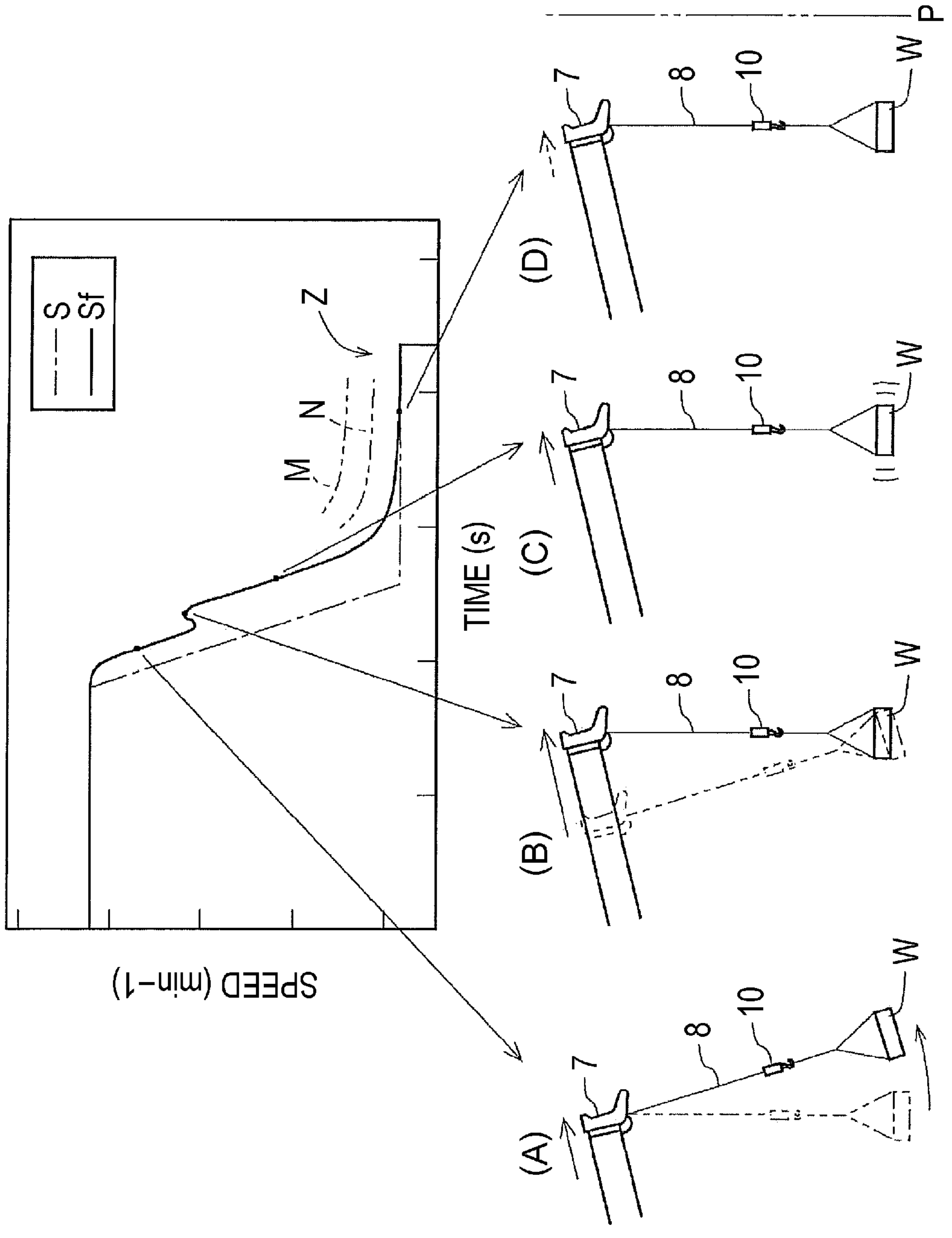
FIG. 8 is a diagram illustrating the movement of the load when a telescopic operation of the boom is automatically stopped.

Next, an example will be described in which the load W is moving toward the movement restriction area. Rr due to the telescopic operation of the boom 7. Here, the description will be given using FIG. 8 together with FIG. 6. (A) to (D) of FIG. 8 schematically illustrate the movement of the load W. Incidentally, although the telescopic operation of the boom 7 is described as an extension operation, the same is applied to a retraction operation.

In step S11, the control device 20 sets a control start location for automatic stop. In other words, the control device 20 sets the control start location at which the extension operation of the boom 7 is stopped. The control start location is determined by the working radius R of the boom 7 (see FIG. 5), the suspension length L of the hook 10, the weight of the load W, and the like in addition to the extension speed of the boom 7.

In step S12, the control device 20 creates the basic control signal S for the telescoping hydraulic cylinder 52 (see FIG. 8). The basic control signal S is created such that a constant low speed command maintains from a section related to the deceleration of the extension speed (an inclined section of the basic control signal S).

Incidentally, the basic control signal S is created on the basis of a program used during automatic stop. The program is stored in the control device 20 in advance.

In step S13, the control device 20 applies the notch filter F to the basic control signal S to create the filtering control signal Sf (see FIG. 8). The filtering control signal Sf is created such that a low speed command maintains from a section related to the deceleration of the extension speed (an inclined section of the filtering control signal Sf) (see Z section in FIG. 8).

Then, the control device 20 controls the telescoping hydraulic cylinder 52 on the basis of the filtering control signal Sf. As a result, it is possible to suppress the swing of the load W due to the deceleration of the extension speed (see (A) to (C) in FIG. 8).

In other words, when the extension speed of the boom 7 is reduced, the load W starts to swing due to inertia (see (A) in FIG. 8). In this regard, by temporarily increasing the extension speed of the boom 7, the boom 7 is caught up, and the swing of the load W is suppressed (see (B) in FIG. 8). Then, thereafter, the load W is decelerated again in the state of suppressing the swing of the load W (see (C) in FIG. 8).

In step S14, the control device 20 causes the boom 7 to continue the low-speed extension operation. In other words, since the filtering control signal Sf is created such that the low speed command maintains from the section related to the deceleration of the extension speed (see Z section in FIG. 8), the control device 20 controls the telescoping hydraulic cylinder 52 on the basis of such a section.

As a result, the load W approaches the predetermined location P without swinging (see (D) in FIG. 8). Incidentally, the extension speed at this time is determined on the basis of at least one of the working radius R of the boom 7, the suspension length L of the hook 10, and the weight of the load W (for example, determined by assigning at least one to a predetermined function: see double-dashed lines M and N in FIG. 8). Such a procedure is performed in order to move the load W to the predetermined location P as quickly as possible while appropriately suppressing the swing of the load W.

In step S15, the control device 20 determines whether or not the load W reaches the predetermined location P. In a case where it is determined that the load W reaches the predetermined location P ("YES" in step S15), the control process proceeds to step S16. On the other hand, in a case where it is determined that the load W does not reach the predetermined location P ("NO" in step S15), the control process continues a low-speed moving operation (an extension operation in this example) in step S14.

Accordingly, the load W is reliably moved to the predetermined location P without stopping before the predetermined location P. Further, since the load W does not swing greatly, the load does not pass the predetermined location P to enter the movement restriction area Rr.

In step S16, the control device 20 stops the extension operation of the boom 7. In this way, the load W reliably stops at the predetermined location P.

As described above, this crane 1 includes the actuator (telescoping hydraulic cylinder 52) which is used for moving the load W and the control device 20 which can instruct the operating state of the actuator (52). When automatically stopping the movement of the load W, the control device 20 applies the notch filter F to the basic control signal S of the actuator (52) to create the filtering control signal Sf. Next, the control device 20 controls the actuator (52) on the basis of the filtering control signal Sf to reduce the moving speed while suppressing the swing of the load W. Thereafter, the control device 20 continues the low-speed movement and stops the load at the predetermined location P.

Specifically, the control device 20 controls the telescoping hydraulic cylinder 52 on the basis of the filtering control signal Sf to reduce the telescoping speed while suppressing the swing of the load W. Thereafter, the control device 20 continues the low-speed telescopic operation and stops the load at the predetermined location P. According to the crane 1 as described above, when the telescopic operation of the boom 7 is automatically stopped, it is possible to decelerate the load W while suppressing the swing of the load W and stop the load at the predetermined location P.

In the crane 1, the telescoping speed in the low-speed telescopic operation is determined on the basis of at least one of the working radius R of the boom 7, the suspension length L of the hook 10, and the weight of the load W. According to such a crane 1, it is possible to move the load W to the predetermined location P as quickly as possible while appropriately suppressing the swing of the load W and stop the load.

By the way, in the crane 1, in order to suppress the swing of the load W caused by the telescopic operation of the boom 7, the frequency of the swing of the load W is set to the resonance frequency ω. However, in order to suppress the swing of the boom 7 itself caused by the telescopic operation of the boom 7, the frequency of the swing of the boom 7 may be set to the resonance frequency ω. Further, the resonance frequency ω may be set in consideration of the frequency of the swing of the load W and the frequency of the swing of the boom 7.

Figure 9:
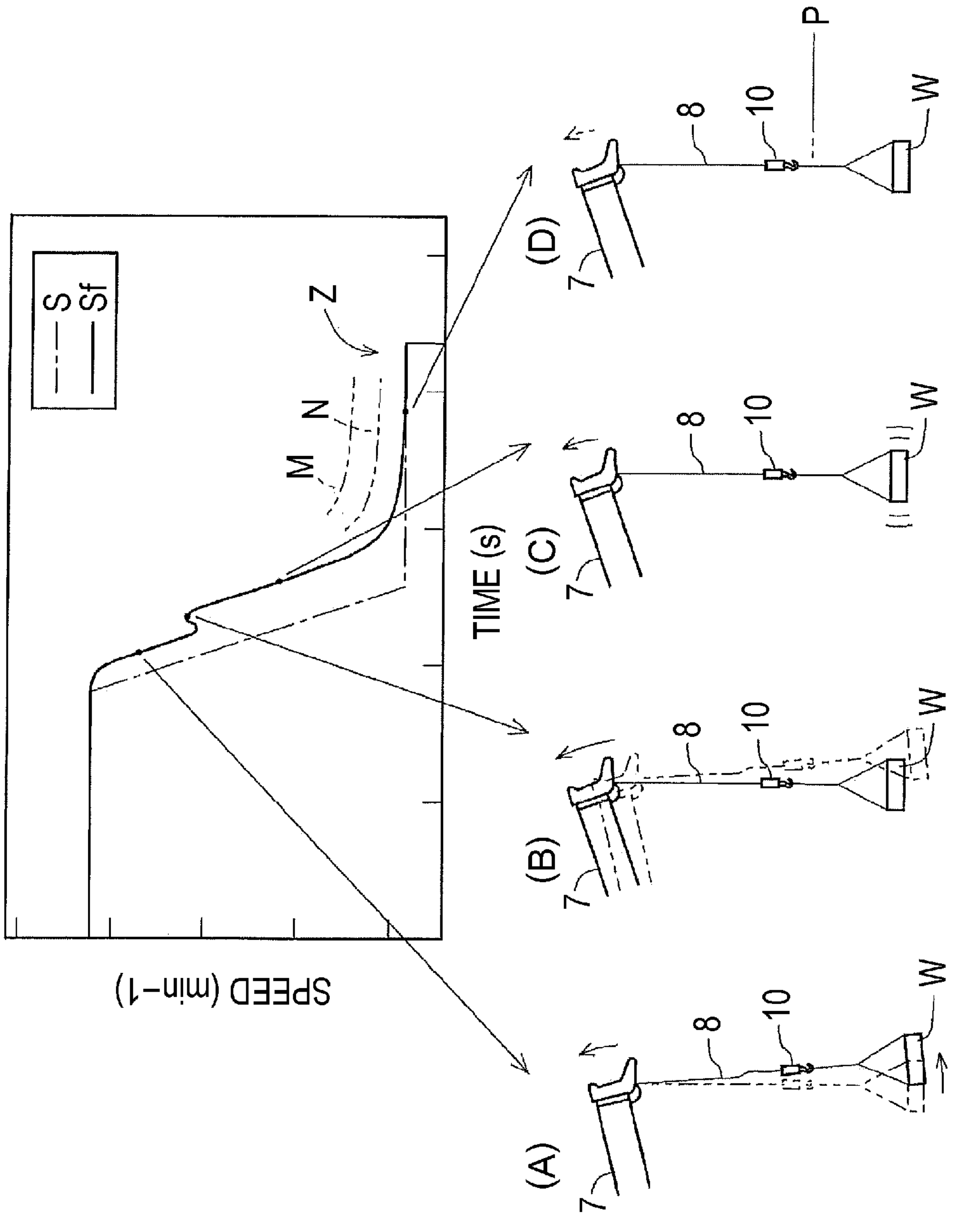
FIG. 9 is a diagram illustrating the movement of the load when a hoisting operation of the boom is automatically stopped.

Next, an example will be described in which the load W is moving toward the movement restriction area Rr due to the hoisting operation of the boom 7. Here, the description will be given with reference to FIG. 9 together with FIG. 6. (A) to (D) of FIG. 9 schematically illustrate the movement of the load W. Incidentally, the hoisting operation of the boom 7 will be described as a standing operation, but the same is applied to a laying operation.

In step S11, the control device 20 sets a control start location for automatic stop. In other words, the control device 20 sets the control start location at which the standing operation of the boom 7 is stopped. The control start location is determined by the working radius R of the boom 7 (see FIG. 5), the suspension length L of the hook 10, the weight of the load W, and the like in addition to the standing speed of the boom 7.

In step S12, the control device 20 creates the basic control signal S for the hoisting hydraulic cylinder 53 (see FIG. 9). The basic control signal S is created such that a constant low speed command maintains from a section related to the deceleration of the standing speed (an inclined section of the basic control signal S). Incidentally, the basic control signal S is created on the basis of a program used during automatic stop. The program is stored in the control device 20 in advance.

In step S13, the control device 20 applies the notch filter F to the basic control signal S to create the filtering control signal Sf (see FIG. 9). The filtering control signal Sf is created such that a low speed command maintains from a section related to the deceleration of the standing speed (an inclined section of the filtering control signal Sf) (see Z section in FIG. 9).

Then, the control device 20 controls the hoisting hydraulic cylinder 53 on the basis of the filtering control signal Sf. As a result, it is possible to suppress the swing of the load W due to the deceleration of the standing speed (see (A) to (C) in FIG. 9).

In other words, when the standing speed of the boom 7 is reduced, the load W starts to swing due to inertia (starts to swing due to the bending of the wire rope 8: see (A) in FIG. 9). In this regard, the standing speed of the boom 7 is temporarily increased to catch up with the boom 7 and suppress the swing of the load W (see (B) in FIG. 9). Then, thereafter, the load W is decelerated again in the state of suppressing the swing of the load W (see (C) in FIG. 9).

In step S14, the control device 20 causes the boom 7 to continue the low-speed standing operation. In other words, since the filtering control signal Sf is created such that the low speed command maintains from the section related to the deceleration of the standing speed (see Z section in FIG. 9), the control device 20 controls the hoisting hydraulic cylinder 53 on the basis of such a section.

As a result, the load W approaches the predetermined location P without swinging (see (D) in FIG. 9). Incidentally, the standing speed at this time is determined on the basis of at least one of the working radius R of the boom 7, the suspension length L of the hook 10, and the weight of the load W (for example, determined by assigning at least one to a predetermined function: see double-dashed lines M and N in FIG. 9). Such a procedure is performed in order to move the load W to the predetermined location P as quickly as possible while appropriately suppressing the swing of the load W.

In step S15, the control device 20 determines whether or not the load W reaches the predetermined location P. In a case where it is determined that the load W reaches the predetermined location P ("YES" in step S15), the control process proceeds to step S16. On the other hand, in a case where it is determined that the load W does not reach the predetermined location P ("NO" in step S15), the control process continues the low-speed standing operation in step S14. Accordingly, the load W is reliably moved to the predetermined location P without stopping before the predetermined location P. Further, since the load W does not swing greatly, the load does not pass the predetermined location P to enter the movement restriction area Rr.

In step S16, the control device 20 stops the standing operation of the boom 7. In this way, the load W reliably stops at the predetermined location P.

As described above, this crane includes the actuator (hoisting hydraulic cylinder 53) which is used for moving the load W and the control device 20 which can instruct the operating state of the actuator (53). Then, when automatically stopping the movement of the load W, the control device 20 applies the notch filter F to the basic control signal S of the actuator (53) to create the filtering control signal Sf. Next, the control device 20 controls the actuator (53) on the basis of the filtering control signal Sf to reduce the moving speed while suppressing the swing of the load W. Thereafter, the control device 20 continues the low-speed movement and stops the load at the predetermined location P.

Specifically, the control device 20 controls the hoisting hydraulic cylinder 53 on the basis of the filtering control signal Sf to reduce the hoisting speed while suppressing the swing of the load W. Thereafter, the control device 20 continues the low-speed hoisting operation and stops the load at the predetermined location P. According to the crane 1 as described above, when the hoisting operation of the boom 7 is automatically stopped, it is possible to decelerate the load W while suppressing the swing of the load W and stop the load at the predetermined location P.

In the crane 1, the hoisting speed in the low-speed hoisting operation is determined on the basis of at least one of the working radius R of the boom 7, the suspension length L of the hook 10, and the weight of the load W. According to such a crane 1, it is possible to move the load W to the predetermined location P as quickly as possible while appropriately suppressing the swing of the load W and stop the load.

By the way, in the crane 1, in order to suppress the swing of the load W caused by the hoisting operation of the boom 7, the frequency of the swing of the load W is set to the resonance frequency ω. However, in order to suppress the swing of the boom 7 itself caused by the hoisting operation of the boom 7, the frequency of the swing of the boom 7 may be set to the resonance frequency ω. Further, the resonance frequency ω may be set in consideration of the frequency of the swing of the load W and the frequency of the swing of the boom 7.

Figure 10:
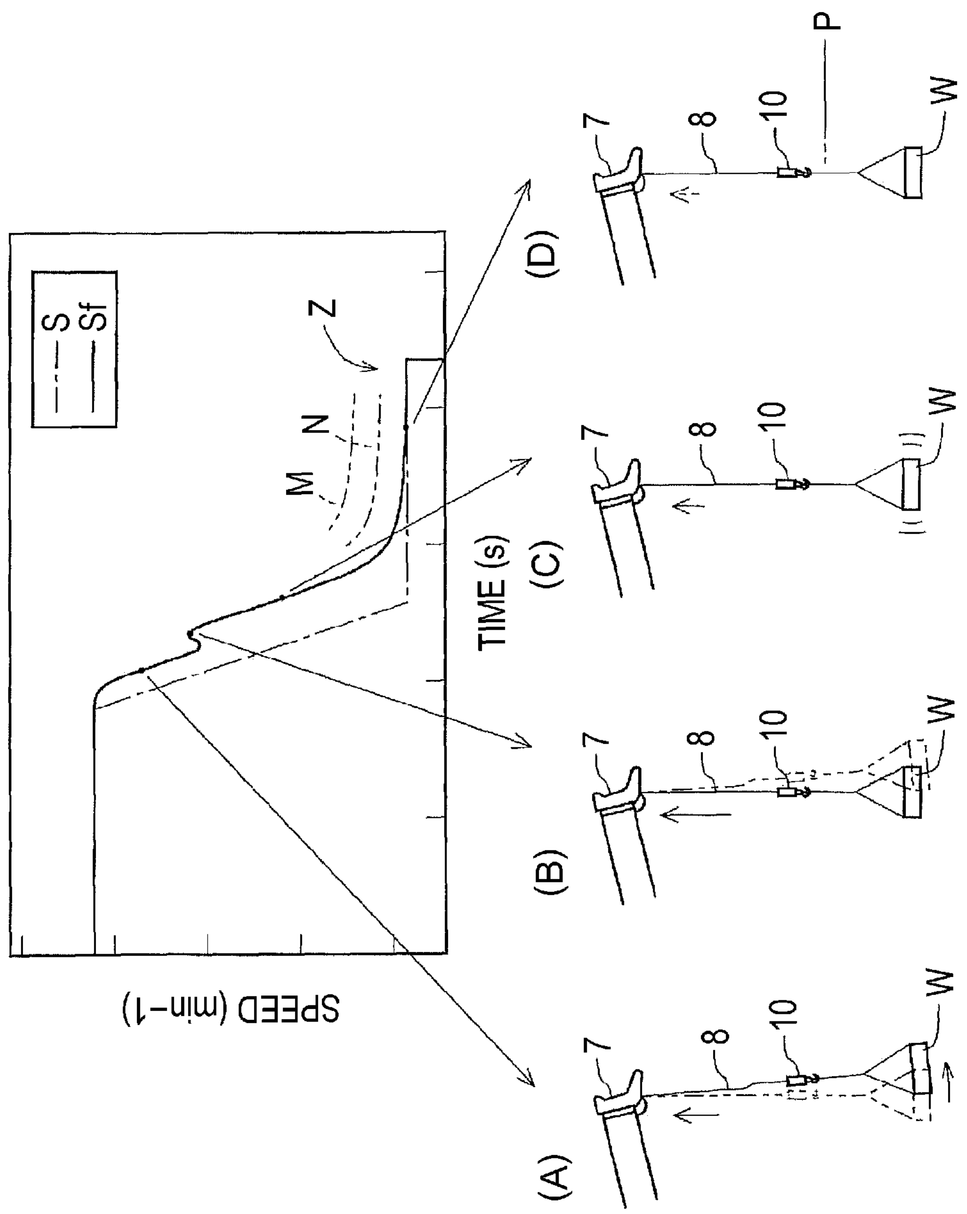
FIG. 10 is a diagram illustrating the movement of the load when a lifting/lowering operation of the hook is automatically stopped.

Next, an example will be described in which the load W is moving toward the movement restriction area Rr due to the lifting/lowering operation of the hook 10. Here, the description will be given with reference to FIG. 10 together with FIG. 6. (A) to (D) of FIG. 10 schematically illustrate the movement of the load W. Incidentally, although the lifting/lowering operation of the hook 10 is described as a lifting operation, the same is applied to a lowering operation.

In step S11, the control device 20 sets a control start location for automatic stop. In other words, the control device 20 sets the control start location at which the lifting operation of the hook 10 is stopped. The control start location is determined by the working radius R of the boom 7 (see FIG. 5), the suspension length L of the hook 10, the weight of the load W, and the like addition to the lifting speed of the hook 10.

In step S12, the control device 20 creates the basic control signal S of the winding hydraulic motor 54 (see FIG. 10). The basic control signal S is created such that a constant low speed command maintains from a section related to the deceleration of the lifting speed (an inclined section of the basic control signal S). Incidentally, the basic control signal S is created on the basis of a program used during automatic stop. The program is stored in the control device 20 in advance.

In step S13, the control device 20 applies the notch filter F to the basic control signal S to create the filtering control signal Sf (see FIG. 10). The filtering control signal Sf is created such that a low speed command maintains from a section related to the deceleration of the lifting speed (an inclined section of the filtering control signal Sf) (see Z section in FIG. 10).

Then, the control device 20 controls the winding hydraulic motor 54 on the basis of the filtering control signal Sf. As a result, it is possible to suppress the swing of the load W due to the deceleration of the lifting speed (see (A) to (C) in FIG. 10).

In other words, when the lifting speed of the hook 10 is reduced, the load W starts to swing due to inertia (starts to swing due to the bending of the wire rope 8: see (A) in FIG. 10). In this regard, the lifting speed of the hook 10 is temporarily increased to stretch the wire rope 8 and suppress the swing of the load W (see (B) in FIG. 10). Then, thereafter, the load W is decelerated again in the state of suppressing the swing of the load W (see (C) in FIG. 10).

In step S14, the control device 20 causes the hook 10 to continue the low-speed lifting operation. In other words, since the filtering control signal Sf is created such that the low speed command maintains from the section related to the deceleration of the lifting speed (see Z section in FIG. 10), the control device 20 controls the winding hydraulic motor 54 on the basis of such a section.

As a result, the load W approaches the predetermined location P without swinging (see (D) in FIG. 10). Incidentally, the lifting speed at this time is determined on the basis of at least one of the working radius R of the boom 7, the suspension length L of the hook 10, and the weight of the load W (for example, determined by assigning at least one to a predetermined function: see double-dashed lines M and N in FIG. 10). Such a procedure is performed in order to move the load W to the predetermined location P as quickly as possible while appropriately suppressing the swing of the load W.

In step S15, the control device 20 determines whether or not the load W reaches the predetermined location P. In a case where it is determined that the load W reaches the predetermined location P ("YES" in step S15), the control process proceeds to step S16.

On the other hand, in a case where it is determined that the load W does not reach the predetermined location P ("NO" in step S15), the control process continues the low-speed lifting operation in step S14. Accordingly, the load W does not stop before the predetermined location P and is reliably moved to the predetermined location P. Further, since the load W does not swing greatly, the load does not pass the predetermined location P to enter the movement restriction area Rr.

In step S16, the control device 20 stops the lifting operation of the hook 10. In this way, the load W reliably stops at the predetermined location P.

As described above, the crane 1 includes the actuator (winding hydraulic motor 54) which is used for moving the load W and the control device 20 which can instruct the operating state of the actuator (54). Then, when automatically stopping the movement of the load W, the control device 20 applies the notch filter F to the basic control signal S of the actuator (54) to create the filtering control signal Sf. Next, the control device 20 controls the actuator (54) on the basis of the filtering control signal Sf to reduce the moving speed while suppressing the swing of the load W. Thereafter, the control device 20 continues the low-speed movement and stops the load at the predetermined location P.

Specifically, the control device 20 controls the winding hydraulic motor 54 on the basis of the filtering control signal Sf to reduce the lifting/lowering speed while suppressing the swing of the load W. Thereafter, the control device 20 continues the low-speed lifting/lowering operation and stops the load at the predetermined location P. According to the crane 1 as described above, when the lifting/lowering operation of the hook 10 is automatically stopped, it is possible to decelerate the load W while suppressing the swing of the load W and stop the load at the predetermined location P.

In the crane 1, the lifting/lowering speed in the low-speed lifting/lowering operation is determined on the basis of at least one of the working radius R of the boom. 7, the suspension length L of the hook 10, and the weight of the load W. According to such a crane 1, it is possible to move the load W to the predetermined location P as quickly as possible while appropriately suppressing the swing of the load W and stop the load.

By the way, in the crane 1, in order to suppress the swing of the load W caused by the lifting/lowering operation of the hook 10, the frequency of the swing of the load W is set to the resonance frequency ω. However, is order to suppress the swing caused by the expansion/retraction of the wire rope 8 caused by the lifting/lowering operation of the hook 10, the frequency of the expansion/retraction of the wire rope 8 may be set to the resonance frequency ω. Further, the resonance frequency ω may be set in consideration of the frequency of the swing of the load W and the frequency of the expansion/retraction of the wire rope 8.

Lastly, in this application, the notch filter F is used as a filter which creates the filtering control signal Sf, but the invention is not limited to this. In other words, any band stop filter may be used which can attenuate or reduce only a specific frequency range. For example, a band limit filter, a band elimination filter, or the like is used.

<Appendix>

A first example of a reference example of a crane according to the present invention includes a boom, a wire rope suspending from the boom, and a hook which lifts/lowers by winding and unwinding the wire rope. The load is carried with the load lifted up with the hook. Such a crane includes an actuator which is used for moving a load and a control device which can instruct an operating state of the actuator. Further, when automatically stopping the movement of the load, the control device applies a filter to a basic control signal of the actuator to create a filtering control signal. Then, the control device controls the actuator by the generated filtering control signal to reduce the moving speed while suppressing the swing of the load, and then continues low-speed movement and stops the movement at a predetermined location.

In a crane according to a second example of the reference example, in a case where the actuator in the crane according to the first example of the reference example is a hydraulic motor which turns the boom, the control device controls the hydraulic motor by a filtering control signal to reduce a turning speed while suppressing the swing of the load, then continue a low-speed turning operation, and stop the load at the predetermined location.

In a crane according to a third example of the reference example, the turning speed in the low-speed turning operation in the crane according to the second example of the reference example is determined on the basis of at least one of the working radius of the boom, the suspension length of the hook, and the weight of the load.

In a crane according to a fourth example of the reference example, in a case where the actuator in the crane according to the first example of the reference example is a hydraulic cylinder which extends/retracts the boom, the control device controls the hydraulic cylinder by a filtering control signal to reduce a telescoping speed while suppressing the swing of the load, then continue a low-speed telescopic operation, and stop the load at the predetermined location.

In a crane according to a fifth example of the reference example, the telescoping speed in the low-speed telescopic operation in the crane according to the fourth example of the reference example is determined on the basis of at least one of the working radius of the boom, the suspension length of the hook, and the weight of the load.

In a crane according to a sixth example of the reference example, in a case where the actuator in the crane according to the first example of the reference example is a hydraulic cylinder which hoists the boom, the control device controls the hydraulic cylinder by a filtering control signal to reduce a hoisting speed while suppressing the swing of the load, then continue a low-speed hoisting operation, and stop the load at the predetermined location.

In a crane according to a seventh example of the reference example, the hoisting speed in the low-speed hoisting operation in the crane according to the sixth example of the reference example is determined on the basis of at least one of the working radius of the boom, the suspension length of the hook, and the weight of the load.

In a crane according to an eighth example of the reference example, in a case where the actuator in the crane according to the first example of the reference example is a hydraulic motor which lifts/lowers the hook, the control device controls the hydraulic motor by a filtering control signal to reduce a lifting/lowering speed while suppressing the swing of the load, then continue a low-speed lifting/lowering operation, and stop the load at the predetermined location.

In a crane according to a ninth example of the reference example, the lifting/lowering speed in the low-speed lifting/lowering operation in the crane according to the eighth example of the reference example is determined on the basis of at least one of the working radius of the boom, the suspension length of the hook, and the weight of the load.

REFERENCE SIGNS LIST

1 Crane
2 Traveling body
3 Turning body
4 Front tire
5 Rear tire
6 Outrigger
7 Boom
8 Wire rope
10 Hook
11 Cabin
20 Control device
**20*a*** Basic control signal creation unit
**20*b*** Resonance frequency calculation unit

20*c* Filter coefficient calculation unit
20*d* Filtering control signal creation unit
21 Turning operation tool
22 Telescopic operation tool
23 Hoisting operation tool
24 Winding operation tool
31 Turning valve
32 Telescoping valve
33 Hoisting valve
34 Winding valve
40 Weight sensor
41 Turning sensor
42 Telescoping sensor
43 Hoisting sensor
44 Winding sensor
51 Turning hydraulic motor (actuator)
52 Telescoping hydraulic cylinder (actuator)
53 Hoisting hydraulic cylinder (actuator)
54 Winding hydraulic motor (actuator)
F Notch filter
P Predetermined location
S Basic control signal
Sf Filtering control signal
W Load

The invention claimed is:

1. A crane comprising:

a operable functional unit;

an actuator for driving the operable functional unit;

a generation unit that, in control of causing the operable functional unit to automatically stop, generates a first control signal including a first deceleration signal section including a control signal for decelerating a speed of the operable functional unit from a first speed to a second speed and a first constant-speed signal section including a control signal for maintaining the speed of the operable functional unit at the second speed;

a filter unit for filtering at least the first deceleration signal section in the first control signal to generate a second control signal; and a control unit that controls the actuator so as to decelerate the operable functional unit on the basis of the second control signal, then controls the actuator so as to maintain the speed of the operable functional unit at the second speed, and controls the actuator so as to zero the speed of the operable functional unit in a case where it is determined that a load suspended from the crane moves to a location satisfying a prescribed condition.

2. The crane according to claim 1, wherein the second control signal includes a second deceleration signal section corresponding to the first deceleration signal section and a second constant-speed signal section corresponding to the first constant-speed signal section, and the control unit controls the actuator to reduce the speed of the operable functional unit on the basis of the second deceleration signal section, and then controls the actuator to maintain the speed of the operable functional unit at the second speed on the basis of the second constant-speed signal section.

3. The crane according to claim 2, wherein in a state where the control unit controls the actuator on the basis of the second constant-speed signal section, in a case where the load suspended on the crane moves to the location satisfying the prescribed condition, the generation unit generates a stop control signal to zero the speed of the operable functional unit, and the control unit controls the actuator on the basis of the stop control signal to zero the speed of the operable functional unit.

4. The crane according to claim 1, wherein the location satisfying the prescribed condition is a boundary location between a first area which is an area where movement of the load is permitted at a work site and a second area which is an area where the movement of the load is not permitted at the work site.

5. The crane according to claim 1, wherein the location satisfying the prescribed condition is a location which is separated by a predetermined distance from a boundary location between a first area which is an area where movement of the load is permitted at a work site and a second area which is an area where the movement of the package load is not permitted at the work site to the first area side.

6. The crane according to claim 1, wherein when controlling the actuator on the basis of the second constant-speed signal section, the control unit controls a flow rate of a hydraulic oil supplied to the actuator to be a minimum flow rate.

7. The crane according to claim 1, wherein the generation unit generates the first control signal in advance before starting the control for automatically stopping.

8. The crane according to claim 7, wherein a duration time of the first constant-speed signal section in the first control signal is a preset predetermined time.

9. The crane according to claim 1, wherein the generation unit generates the first control signal section in advance before starting the control, and generates the first constant-speed signal section in real time in a case where the speed of the operable functional unit becomes the second speed after starting the control for automatically stopping, and the control unit controls the actuator to maintain the speed of the operable functional unit at the second speed on the basis of the first constant-speed signal section generated in real time.

10. The crane according to claim 1, wherein the actuator is any one of a hydraulic motor which turns a boom, a hydraulic cylinder which extends/retracts the boom, a hydraulic cylinder which hoists the boom, and a hydraulic motor which lifts/lowers a hook.

* * * * *